(12) United States Patent
Dotti et al.

(10) Patent No.: US 11,396,562 B2
(45) Date of Patent: Jul. 26, 2022

(54) EXTRUSION COATING RESIN FROM TUBULAR REACTOR

(71) Applicant: Braskem S.A., Camaçari (BR)

(72) Inventors: Eduardo José Dotti, São Paulo (BR); Omar Wandir Renck, São Paulo (BR); Roger Ribeiro Malmegrim, São Paulo (BR); Marcelo Farah, São Paulo (BR); Antonio Marchi Netto, São Paulo (BR); Cid Miro Neto, São Paulo (BR); Jorge Manuel Jardim da Silva, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 16/820,306

(22) Filed: Mar. 16, 2020

(65) Prior Publication Data
US 2020/0291146 A1    Sep. 17, 2020

Related U.S. Application Data

(60) Provisional application No. 62/818,567, filed on Mar. 14, 2019, provisional application No. 62/818,575, filed on Mar. 14, 2019.

(51) Int. Cl.
*C08F 110/02* (2006.01)
*C09D 123/06* (2006.01)

(52) U.S. Cl.
CPC .......... *C08F 110/02* (2013.01); *C09D 123/06* (2013.01)

(58) Field of Classification Search
USPC ........................................................ 526/64
See application file for complete search history.

(56) References Cited

U.S. PATENT DOCUMENTS

| | | | | |
|---|---|---|---|---|
| 3,334,081 A | * | 8/1967 | Madgwick | C08F 2/38 |
| | | | | 526/64 |
| 4,396,789 A | | 8/1983 | Barrocas et al. | |
| 4,788,265 A | * | 11/1988 | Pfleger | C08F 210/02 |
| | | | | 526/318.45 |
| 6,291,590 B1 | | 9/2001 | Sainio et al. | |
| 9,181,143 B2 | | 11/2015 | do Carmo et al. | |

(Continued)

FOREIGN PATENT DOCUMENTS

| | | | | |
|---|---|---|---|---|
| DE | 120200 | * | 6/1976 | C08F 3/04 |
| EP | 1777238 A1 | | 4/2007 | |

(Continued)

OTHER PUBLICATIONS

Machine translation of DD 120200; publication date: Jun. 1976 (Year: 1976).*

(Continued)

*Primary Examiner* — Fred M Teskin
(74) *Attorney, Agent, or Firm* — Osha Bergman Watanabe & Burton LLP

(57) ABSTRACT

A method may include polymerizing ethylene in a tubular reactor, where the polymerization is substantially free of a chain transfer agent. A method may include polymerizing ethylene in a tubular reactor, the ethylene having a specific delivery pressure and the polymerization having one or more specific peak temperatures. The molecular weight of the resulting polyethylene may be controlled by the selection of the delivery pressure and the one or more peak temperatures.

17 Claims, 8 Drawing Sheets

(56) References Cited

U.S. PATENT DOCUMENTS

| | | | |
|---|---|---|---|
| 2004/0214971 A1 | 10/2004 | Gonioukh et al. | |
| 2007/0225445 A1 | 9/2007 | Nguyen et al. | |
| 2013/0295289 A1 | 11/2013 | Littmann et al. | |
| 2013/0333832 A1 | 12/2013 | Vittorias et al. | |
| 2015/0274856 A1* | 10/2015 | Berbee .................. | C08F 110/02 |
| | | | 521/143 |

FOREIGN PATENT DOCUMENTS

| | | |
|---|---|---|
| EP | 2123707 A1 | 11/2009 |
| EP | 2621963 A1 | 8/2013 |
| EP | 2855538 A1 | 4/2015 |
| KR | 101831530 B1 | 2/2018 |
| WO | 2006/094723 A1 | 9/2006 |
| WO | 2013/078018 A2 | 5/2013 |
| WO | 2013/083285 A1 | 6/2013 |
| WO | 2013178241 A1 | 12/2013 |
| WO | 2014081458 A1 | 5/2014 |
| WO | 2016204949 A1 | 12/2016 |

OTHER PUBLICATIONS

International Search Report issued in corresponding International Application No. PCT/IB2020/020013, dated Jun. 8, 2020 (7 pages).
Written Opinion issued in corresponding International Application No. PCT/IB2020/020013, dated Jun. 8, 2020 (8 pages).

\* cited by examiner

EXTRUSION COATING RESIN FROM TUBULAR REACTOR

BACKGROUND

Polyethylene is currently one of the most widely used plastics in the world. Though it is most commonly used as a packaging material, the ability to produce a wide variety of polyethylenes that exhibit a range of properties enables the use of polyethylene in a multitude of diverse applications. One such application, particularly of low density polyethylene, is in the extrusion coating of substrates to improve their performance in various aspects, such as moisture retention/repulsion, chemical resistance, adhesion, and appearance.

Extrusion coating generally involves extruding a polymer film through a flat die, stretching the extruded film in the air, and subsequently coating the film on a substrate. The suitability of a polymer for extrusion coating is dependent on many parameters, but especially the neck-in (the reduction in width of the film as it leaves the die) and the drawdown (the ability of the polymer to evenly coat a substrate without breakage, determines the maximum line speed) of the polymer. These properties are dependent on the structure of the polymer.

Polyethylene for extrusion coating is generally produced by the use of an autoclave or a tubular reactor. Historically, autoclave reactors have been the method of choice as they allow for the production of polyethylene that exhibit suitable characteristics, such as long-chain branching, a broad molecular weight distribution, and the presence of a high molecular weight fraction. These properties yield a high-quality polyethylene that is extremely suitable for high speed coating.

Autoclave reactors can only provide a small capacity as compared to newer tubular reactors and are being replaced as they become older and obsolete. However, autoclave and tubular reactors do not produce identical products, with tubular reactors generally providing lower quality polyethylene that is less suitable for extrusion coating.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include polymerizing ethylene in a tubular reactor, the polymerization being substantially free of a chain transfer agent.

In another aspect, embodiments disclosed herein relate to methods that include polymerizing ethylene in a tubular reactor, the ethylene having a specific delivery pressure and the polymerization having one or more specific peak temperatures wherein the molecular weight of the resulting polyethylene is controlled by the selection of the delivery pressure and the one or more peak temperatures.

In another aspect, embodiments disclosed here relate to methods that include polymerizing ethylene in a tubular reactor, the ethylene having a delivery pressure ranging from about 1400 to 1800 bar:

In yet another aspect, embodiments disclosed here relate to ethylene-containing polymers produced by methods that include polymerizing ethylene in a tubular reactor, the polymerization being substantially free of a chain transfer agent.

In a further aspect, embodiments disclosed here relate to ethylene-containing polymers produced by methods that include polymerizing ethylene in a tubular reactor, the ethylene having a specific delivery pressure and the polymerization having one or more specific peak temperatures wherein the molecular weight of the resulting polyethylene is controlled by the selection of the delivery pressure and the one or more peak temperatures.

In a further aspect, embodiments disclosed here relate to articles including a substrate and anethylene-containing polymers produced by methods that include polymerizing ethylene in a tubular reactor, the ethylene having a delivery pressure ranging from about 1400 to 1800 bar:

In yet another aspect, embodiments disclosed here relate to articles that include a substrate and an extrusion coating made from an ethylene-containing polymer that is produced by a method that includes polymerizing ethylene in a tubular reactor, the polymerization being substantially free of a chain transfer agent.

In a further aspect, embodiments disclosed here relate to articles that include a substrate and an extrusion coating made from an ethylene-containing polymer produced by a method that includes polymerizing ethylene in a tubular reactor, the ethylene having a specific delivery pressure and the polymerization having one or more specific peak temperatures wherein the molecular weight of the resulting polyethylene is controlled by the selection of the delivery pressure and the one or more peak temperatures.

In a further aspect, embodiments disclosed here relate to articles that include a substrate and an extrusion coating made from an ethylene-containing polymer produced by a method that includes polymerizing ethylene in a tubular reactor, the ethylene having a delivery pressure ranging from about 1400 to 1800 bar:

Other aspects and advantages of the claimed subject matter will be apparent from the following description and the appended claims.

DETAILED DESCRIPTION

Figure 1:
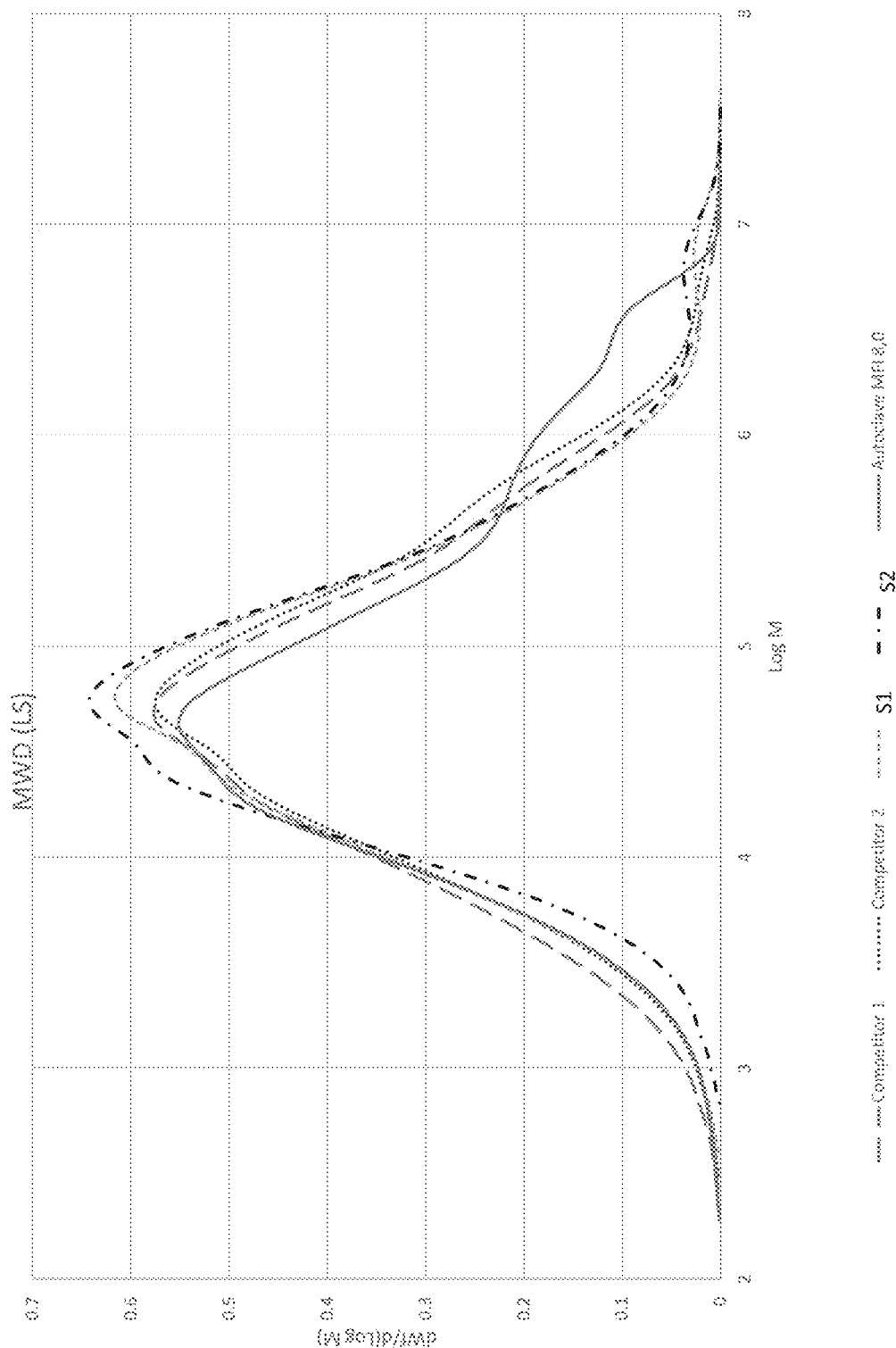
FIG. 1 shows molecular weight spectra of the polyethylene samples.

In one aspect, embodiments disclosed herein relate to processes for producing ethylene-containing polymers in a tubular reactor, in the absence of chain transfer agents. In another aspect, embodiments disclosed herein relate to processes for producing ethylene-containing polymers in a tubular reactor at low pressures.

In a further aspect, embodiments disclosed herein relate to processes for polymerizing ethylene and controlling the molecular weight of the resulting polymer only through the selection of specific temperature and pressure conditions within the reactor.

Polymerization

As mentioned above, the majority of extrusion coating resins (specifically low-density polyethylene or LDPE) is primarily manufactured in autoclave reactors in order to achieve the desired distribution (broad molecular weight distribution and long chain branching) for extrusion coating. Autoclave reactors can be considered to be a continuous stirred tank reactor, where cooling is achieved by the ethylene that enters the reactor. The broad distribution and long chain branching result from the large distribution in residence time and back mixing. In contrast, a tubular reactor is a long tub where the mass is transported as a plug flow. Instead of being cooled by the ethylene stream, cooling occurs by the circulation of cold water around the tube. The pressure and temperature are generally higher in a tubular reactor than in an autoclave reactor. There generally is not a stirrer present, but there is laminar flow behavior at the wall. Generally, due to the plug flow, the residence time is approximately the same for each polymer chain, which results in a smaller molecular weight distribution with less long chain branching. The two reactors, by virtue of the very different mixing and residence times, have very distinct control of reaction conditions and hence the molecular structure (and end properties) of the products is different.

In accordance with one or more embodiments of the present disclosure, a tubular reactor may be used to form LDPE, rather than an autoclave reactor. Despite the use of a tubular reactor, the present inventors have found that by using the temperature and pressure of the tubular reactor, an LDPE with broader molecular weight distribution and long chain branching than generally obtainable from a tubular reactor may be achieved.

Generally, a tubular reactor polymerization may be performed using a set of two compressors (a primary and a high-pressure compressor), a tubular polymerization reactor, and two separators for separating the monomer-polymer mixture leaving the tubular reactor. Monomer may be supplied to the tubular reactor either solely in the beginning of the reactor or only partly in the beginning with the other part fed via one or more side feed entries. In one or more embodiments, initiators may be injected in multiple places along the tube, thus creating multiple reaction zones. In the first separator (a high-pressure separator), ethylene may be separated from the monomer-polymer mixture and recycled to the ethylene-feed between the primary compressor and the high-pressure compressor. In the second separator (a low-pressure separator), the ethylene may be separated from the mixture, compressed in a booster compressor, and added to the stream of fresh ethylene before it is fed to the primary compressor.

A fresh supply of ethylene may be firstly compressed to a first pressure by primary compressor and then compressed to the reaction pressure using high pressure compressor. The reaction mixture leaving the high-pressure compressor may be fed to a pre-heater, where the reaction mixture is pre-heated to the reaction start temperature (for example, from about 120° C. to 220° C.) and prior to being conveyed to the tubular reactor.

The tubular reactor may be a long, thick-walled pipe with cooling jackets to remove the liberated heat of reaction from the reaction mixture by means of a coolant circuit (as mentioned above). The tubular reactor may have a plurality of spatially separated initiator injection points for feeding initiators or initiator mixtures to the reactor and a corresponding number of reaction zones if initiator is fed to all initiator injection points. In one or more embodiments there may be two or more injection points. In particular embodiments there may be three injection points.

By feeding suitable free-radical initiators to the tubular reactor, which decompose at the temperature of the reaction mixture, the polymerization reaction starts. The generated heat of the reaction raises the temperature of the reaction mixture, since more heat is generated than can be removed through the walls of the tubular reactor. The rising temperature increases the rate of decomposition of the free-radical initiators and accelerates polymerization until all free-radical initiators are consumed. Thereafter no further heat is generated and the temperature decreases again since the temperature of the reactor walls is lower than that of the reaction mixture. Accordingly, the part of the tubular reactor downstream of an initiator injection point, in which the temperature rises, is the reaction zone, while the part thereafter, in which the temperature decreases again, is predominantly a cooling zone.

The amount and nature of added free-radical initiators determines how much the temperature rises and accordingly allows adjusting that value. In particular embodiments, at least two reaction zones and, therefore, at least two peak temperatures are present in the tubular reactor, which may be different from, or the same as, one another. In one or more embodiments the maximum peak temperature may be at most 320° C. For example, the methods may have a maximum peak temperature that is of an amount ranging from 200 to 320° C. In particular embodiments, a first peak temperature is less than a subsequent peak temperature. For example, a lower (and initial) peak temperature may be of the range of about 200 to 240° C., or of an amount ranging from a lower limit of any of 200, 205, 210, 215, or 220° C. to an upper limit of any of 225, 230, 235, or 240° C., where any lower limit can be used in combination with any upper limit. A subsequent peak temperature may have a lower limit of any of 260, 265, 270, 275, 280, 285, 290, 295 or 300° C. to an upper limit of any of 285, 290, 295, 300, 305, 310, 315, or 320° C., where any lower limit can be used in combination with any upper limit. In particular embodiments, the first peak temperature may have a peak temperature that is 30 to 80° C. less than a subsequent or second peak temperature (and not less than 60° C. in more particular embodiments). It is also envisioned that there may be more than two peak temperatures, and that the peak temperature of a third peak temperature may be approximate or greater than (such as within 10° C.) of the second peak temperature. In particular, in one or more embodiments, there are at least three peak temperatures during the polymerization at the tubular reactor. Further, it is also envisioned that other specific temperature profiles may be used.

Polymerizations in accordance with the present disclosure may be performed at a lower pressure than is typically found in the art for tubular reactors (for example at a pressure that is 30-50% lower than what is conventionally used in tubular reactors). The use of a lower pressure may allow for reduced energy consumption and thus a more economical process; however, the reason for using the lower pressure is that the present inventors have advantageously found that use of such lower pressure results in a polymer having the desired properties for extrusion coating. In one or more embodiments the ethylene may have a pressure that is at most 1900 bar. For example, the methods may have an ethylene pressure that is of an amount ranging from a lower limit of any of 1100, 1200, 1300, 1400, 1500 or 1600 bar to an upper limit of any of 1400, 1500, 1600, 1700, 1800, or 1900 bar, where any lower limit can be used in combination with any upper limit.

The reaction mixture may leave the tubular reactor through a high-pressure let-down valve and pass a post reactor cooler. Thereafter, the resulting polymer may be separated off from unreacted ethylene and other low molecular weight compounds (monomers, oligomers, polymers, additives, solvent, etc.) by means of a high-pressure separator and a low-pressure separator, discharged and pelletized via an extruder and granulator.

Further, in the above description, there is no mention of a chain transfer agent (CTA), which are conventionally used in polymerization processes to control the molecular weight of the polymer. CTAs typically feature one or more weak chemical bonds and react with a free-radical site of a growing polymer chain to limit chain growth. Common CTAs include olefins and aromatic hydrocarbons, thiol-containing species, organohalogen compounds, alcohol-containing species, aldehyde-containing species, and ketone-containing species.

Uniquely, one or more embodiments of the current disclosure produce ethylene-containing polymers without the use of CTAs or being substantially free of CTAs, instead relying upon the selection of process parameters, such as reactor pressure and temperature, to ensure a suitable average molecular weight and molecular weight distribution. This approach is advantageous for extrusion coating as the present inventors have found that the lack of CTAs in a tubular reactor polymerization can provide a broader molecular weight distribution than is conventionally obtained from tubular reactor processes. Thus, as mentioned above, rather than using CTAs to control molecular weight, the present disclosure uses a combination of pressure and temperature to produce LDPEs having a broad molecular weight distribution, a high molecular weight fraction and long chain branching, properties that render the LDPE as being highly suitable for extrusion coating.

In one or more embodiments, methods in accordance with the present disclosure are substantially free of CTAs. For the purposes of this disclosure, being "substantially free" should be interpreted as meaning that the amount of CTA present is sufficiently low as to not substantially affect the average molecular weight or the molecular weight distribution of the polymer. In some embodiments, the total amount of CTAs in the polymerization is less than 0.3%, less than 0.2%, less than 0.1%, less than 0.05%, less than 0.02%, or less than 0.01% by volume, with respect to the volume of the monomers.

In one or more embodiments, no CTAs are intentionally added during the tubular reactor. However, the ethylene stream may contain impurities that can function as CTAs. Through using a purging stream of gas, the build-up of these impurities may be limited so that the reactor remains substantially free of CTAs and that the process and product is unaffected.

As different CTAs may have different "chain transferability", a chain transfer power ($C_p$) is calculated by equation (I):

$$\Sigma([CTA_i] \times C_{si}) \times 1000 = C_p \quad (I)$$

where $[CTA_i]$ is the concentration of the CTA agent i (in vol. %) and $C_{si}$ is the chain transfer constant ($C_s$) of the CTA agent i as provided by Ehrlich et al., *Adv. Polymer Sci.*, 1970, 7, 386-448. In one or more embodiments, the polymerization may have a chain transfer power of less than about 5.0%. In some embodiments, the chain transfer power may be less than about 5.0, 4.0, 3.0, 2.0, 1.5, 1.0, 0.8, 0.5, or 0.3%.

In one or more embodiments, methods in accordance with the present disclosure use a free radical initiator in a free radical polymerization process. In such embodiments, the initiator is not particularly limited, and any suitable initiator known to one of ordinary skill in the art may be used. One of ordinary skill will appreciate that the initiator will generally be selected to be functional under the particular conditions of the embodiment. Commonly used initiators include organic peroxides, though any species may be used that forms a free radical under the conditions of the experiment. There may be only one addition of an initiator or multiple additions. In some embodiments, there may be three or more additions of the initiator to the reactor.

Possible initiators for starting the free-radical polymerization in the respective reaction zones are, for example, air, oxygen, azo compounds or peroxidic polymerization initiators. Initiation using organic peroxides or azo compounds represents a particularly preferred embodiment of the process of the invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert butyl peroxy-2-ethyl hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

The initiators can be employed individually or as a mixture in concentrations of from 0.1 to 50 mol/t of polyethylene produced, in particular from 0.2 to 20 mol/t, in each zone. It is often advantageous to use the initiators in the dissolved state. The solutions comprise the initiators or initiator mixtures in proportions of from 2 to 65% by weight, preferably from 5 to 40% by weight and particularly preferably from 10 to 30% by weight. Particular preference is given to using mixtures of initiators which have different decomposition temperatures.

The ethylene used in one or more embodiments of the present disclosure may include ethylene generated from petroleum-based monomers and/or biobased monomers (i.e., renewable sources of carbon), such as ethylene obtained by the dehydration of biobased alcohols obtained from sugarcane.

For example, in one or more embodiments, the renewable source of carbon is one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof.

In one or more embodiments, the bio-based ethylene may be obtained by fermenting a renewable source of carbon to produce ethanol, which may be subsequently dehydrated to produce ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Thus, biologically sourced ethanol, known as bio-ethanol, is obtained by the fermentation of sugars derived from cultures such as that of sugar cane and beets, or from hydrolyzed starch, which is, in turn, associated with other cultures such as corn. It is also envisioned that the bio-based ethylene may be obtained from hydrolysis-based products from cellulose and hemi-cellulose, which can be found in many agricultural by-products, such as straw and sugar cane husks. This fermentation is carried out in the presence of varied microorganisms, the most important of such being the yeast *Saccharomyces cerevisiae*. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

In one or more embodiments, the ethylene-containing polymer may exhibit a bio-based carbon content, as determined by ASTM D6866-18 Method B of at least 5%. Further, other embodiments the polyolefin may include at least 10%, 20%, 40%, 50%, 60%, 80%, or 90% bio-based carbon.

Polymers

The ethylene-containing polymers that are produced by one or more embodiments of the present disclosure may be copolymers or polyethylene homopolymers. In embodiments where copolymers are produced, ethylene is polymerized with one or more comonomers.

Despite being produced by use of a tubular reactor, ethylene-containing polymers produced in accordance with the present disclosure may generally exhibit properties and features that are more commonly associated with polymers produced by autoclave methods. These properties may arise from one or more embodiments yielding a broader molecular weight distribution than is typically obtained from a tubular process. Additionally, in some embodiments, polymers produced in accordance with the present disclosure may exhibit a high molecular weight fraction higher than would be expected for a tubular product. In one or more embodiments, a gel permeation chromatography (GPC) analysis of the ethylene-containing polymer produced may, at a weight of log M of 6.5 Da and more, have a fraction providing an area under the curve of at least 1.5% relative to a total area under the curve. In some embodiments, the area may be at least 1.0%, at least 1.5%, at least 1.6%, at least 1.8%, at least 2.0%, or at least 2.2%. The GPC experiments may be carried out by gel permeation chromatography coupled with triple detection, with an infrared detector IR5 and an eight-angle light scattering detector (Wyatt). A set of 4 mixed bed, 13 μm columns (Tosoh) may be used at a temperature of 140° C. The experiments may use a concentration of 1 mg/mL, a flow rate of 1 mL/min, a dissolution temperature and time of 160° C. and 60 minutes, respectively, an injection volume of 200 μL, and a solvent of trichlorium benzene stabilized with 100 ppm of BHT.

In one or more embodiments, the ethylene-containing polymer produced may have a weight average molecular weight ($M_w$) ranging from about 250,000 to about 320,000 g/mol. For example, the polyethylene may have a $M_w$ that is of an amount ranging from a lower limit of any of 250,000, 275,000, 280,000, 285,000 or 290,000 g/mol to an upper limit of any of 300,000, 307,000, 310,000, or 320,000 g/mol, where any lower limit can be used in combination with any upper limit.

In one or more embodiments, the ethylene-containing polymer may have a Z average molecular weight ($M_z$) that ranges from about 4,000,000 to 5,500,000 g/mol. For example, the polyethylene may have a $M_z$ that is of an amount ranging from a lower limit of any of 4,000,000, 4,250,000, 4,750,000, or 5,000,000 g/mol to an upper limit of any of 5,000,000, 5,250,000 or 5,500,000 g/mol, where any lower limit can be used in combination with any upper limit.

In one or more embodiments, the ethylene-containing polymer may have a number average molecular weight ($M_n$) that ranges from about 11,500 to 28,000 g/mol. For example, the polyethylene may have a $M_n$ that is of an amount ranging from a lower limit of any of 11,500, 12,000, 13,000, or 15,000 g/mol, to an upper limit of any of 16,000, 20,000, 25,000 or 28,000 g/mol, where any lower limit can be used in combination with any upper limit.

In one or more embodiments, the ethylene-containing polymer produced may have a polydispersity index ($M_w/M_n$, where $M_n$ is the number average molecular weight) that is greater than about 13.0. For example, the polyethylene may have a polydispersity index that is of an amount greater than about 13.0, 13.4, 14.0, 15.0, 16.0, or 17.0.

Ethylene-containing polymers produced in accordance with the present disclosure may be a low-density polyethylene. In one or more embodiments the polyethylene may have a density that is at most 0.935 g/cm³. For example, the polyethylene may have a density that is of an amount ranging from a lower limit of any of 0.914, 0.916, 0.918, or 0.920 g/cm³ to an upper limit of any of 0.922, 0.924, 0.926, 0.930, or 0.935 g/cm³, where any lower limit can be used in combination with any upper limit. Samples for density measurement may be prepared according to ASTM D 4703 for one minute. Measurements may be made within a minimum of one hour of sample pressing using ASTM D792, Method B.

In one or more embodiments, the ethylene-containing polymer produced may have an elastic modulus (G') that is above about 105 Pa at 170° C. (G' at G"=500 Pa·s). For example, the polymer may have an elastic modulus that is greater than about 105, 107, 110, 112, or 115 Pa. In one or more embodiments, rheological measurements may be performed using a StressTech controlled stress melt rheometer. Polymer pellets may be melted, compressed and stamped into discs with a diameter of 25 mm and a thickness of 3 mm Parallel plates can be used and measurements performed under a nitrogen atmosphere. Oscillatory measurements may be performed at 170° C. in the linear viscoelastic region with a frequency sweep between 20 and 0.01 Hz. When a material undergoes oscillatory stress with frequency, the response can be expressed in terms of a storage modulus, (G') a loss modulus, (G") and a complex viscosity, ($\eta^*$). G' may be determined at G" 500 Pa by the use of a Cole-Cole plot. The log G" is plotted versus the log G' in a G" range of 200-900 Pa. A linear relation is obtained and G' can be determined where G" equal to 500 Pa (log 500=2.7).

In one or more embodiments, the ethylene-containing polymer produced may have a zero-shear viscosity ($\eta_0$) ranging from about 8,000 to 13,000 Pa·s at 170° C. For example, the polyethylene may have a zero shear viscosity that is of an amount ranging from a lower limit of any of 8,000, 9,000, 10,500, 11,750, or 12,000 Pa·s to an upper limit of any of 12,000, 12,250, 12,500, 12,750, or 13,000 Pa·s, where any lower limit can be used in combination with any upper limit. Zero shear viscosity may be determined by extrapolation by the use of a 3 parameter Cross equation $\eta^* = \eta_0/(1+(\tau\omega)_n)$.

In one or more embodiments, the ethylene-containing polymer produced may have a melt flow index (MFI, g/10 min or dg/min), measured in accordance with ASTM D 1238, conditions of 190° C./2.16 kg, ranging from about 3.5 to 6.0 g/10 min. For example, the polymer may have a zero viscosity that is of an amount ranging from a lower limit of any of 3.5, 3.6, 3.7, 3.8, or 4.0 g/10 min to an upper limit of any of 4.0, 4.5, 5.1, 5.3, 5.7, or 6.0 g/10 min, where any lower limit can be used in combination with any upper limit.

In one or more embodiments, the ethylene-containing polymer produced may have a hexane extractable content ranging from about 5.5% by weight or less. The hexane extractable content may be determined by an extraction/gravimetric procedure for determination of the amount of hexane soluble low molecular weight material present in polyethylene. The test method may be a modification of the Food and Drug Administration (FDA) procedure for determining hexane extractables of polyolefins, based upon the presumption that the weight of the residue extract present in the solvent is equal to the amount extracted from the film sample and could therefore be quantified by measuring the weight loss of the extracted film. In some embodiments, films may be cut into 10×2.5 cm and weighed. Film with a thickness not exceeding 4 mm may be used for each extraction. The films were then extracted for 2 hours, in a hexane vessel containing about 200 ml of hexane, at 49.5±0.5° C. in a heated water bath, dried, and weighed. In some embodiments, the hexane extractable content may be about 5.0% by weight or less, about 4.5% by weight or less, about 4.0% by weight or less, or about 3.5% by weight or less.

In some embodiments, hexane extractable levels comply with the strict FDA food contact limit of less than 5.5 wt % hexane extractable for non-cook-in applications ("Polyethylene for Use in Articles that Contact Food Except for Articles Used in Packing or Holding Food During Cooking" in "Olefin Polymers" Code of Federal Regulations, Title 21, Pt. 1520.77; (d)(3)(ii) Option 2, 177.1520(c) Paragraph 2.1 (2001)).

In one or more embodiments, the ethylene-containing polymer produced may have a melt strength ranging from about 8 to 10 cN at 190° C. In some embodiments, the polymer may have a melt strength that is of an amount ranging from a lower limit of any of 7.0, 7.5, 8.0, 8.5 or 9.0 cN at 190° C. to an upper limit of any of 8.5, 9.0, 9.5, or 10.0 cN at 190° C., where any lower limit can be used in combination with any upper limit.

In one or more embodiments, the ethylene-containing polymer produced may have a melt strength that is greater than about 6.0 cN. In some embodiments, the polymer may have a melt strength that is at least 6.0, 8.0, 8.5, 9.0, 9.5, 10.0, 10.5 or 15 cN. In one or more embodiments, a RHEOTENS apparatus (Gottfert) may be used to measure the extensional properties ("melt strength") of the polymers. Polymer melts at 190° C. may draw a vertical melt strand at a constant pull-off speed or with a linear or exponentially accelerating velocity. The RHEOTENS measures the force needed to elongate the strand, and calculates elongational stress, draw ratios, rate of elongation and elongational viscosity. The instrument is best used in combination with a suitable capillary rheometer where the RHEOTENS can be located close to the exit of the capillary. It may also be used with an extruder using a 90° deflection head (or exit) die. The melt strand is taken-off only vertically.

In one or more embodiments, the ethylene-containing polymer produced may have an extensibility, at 190° C., that is greater than 9 cm/s. In some embodiments, the polymer may have an extensibility that is at least 9.0, 9.5, 10.0, 11, 12, or 13 cm/s. Extensibility is the maximum pulloff speed at melt strength test, before thread rupture or disturb (neck in).

For extrusion of the polymer strand, a laboratory extruder (Extrusiometer with a screw diameter of D=25.4 mm and a screw length of 20D) may be used in combination with a gear pump and a RHEOTENS apparatus. The extrusion pressure may be measured in front of the extrusion die (diameter $d_0$=2 mm, L/$d_0$=15, entrance angle) 50°, and was kept constant by a feed-back loop that controlled the gear pump. The length of the spinline, $L_0$, may be constant and equal to 100 mm Under these process conditions and with die exit velocities $v_0$ typically 30 to 100 mm/s, it can be assumed that cooling of the extruded strand in the spinline is small, and that the polymer melt is elongated under quasi-isothermal conditions.

Extrusion Coating & Articles

Any of the above-mentioned polymers may be extruded through a flat die and stretched in air to provide a coating for substrates. One or more embodiments of the present invention are directed to articles that comprise a coated substrate. The articles of one or more embodiments of the present invention may comprise a substrate that is paper, cardboard, or metal foil.

The properties of articles formed according to the present disclosure will generally be suitable for the articles intended use. One of ordinary skill in the art will, with the benefit of this present disclosure, appreciate that altering the relative amounts and/or identities of the components of a polymer composition will influence the properties of an article formed therefrom.

EXAMPLES

In the following examples, ethylene-containing polymers were produced according to the methods described herein and assayed to study various properties.

Example 1—Process Conditions for Polymer Preparation

With the objective of improving polymer processing performance (e.g. in extrusion coating) to achieve similar performances of high pressure autoclave process produced polymers while maintaining productivity of high pressure continuous tubular polymerization process, the present process conditions in tubular polymerization was set as detailed in Table 1 below. Inventive examples of polymer S1 and S2 were produced without the use of chain transfer agents (CTA) under low delivery pressures (reactor pressure). For comparative purposes, a reference polyethylene high pressure tubular polymerization condition is also shown. The main objective was to generate high molecular weight fractions in the polyethylene chain capable to improve the polymer processing performance. By the use of lower pressures, when compared to the usual pressures used in tubular reactors, and lower peak temperatures at initial zones of the tubular reactor, the molecular weight distribution (MWD) can be broadened in the direction of higher molecular weights. Additionally, though not measured, the long chain branching (LCB) level might also be increased due to chain transfer to the polymer chain itself.

TABLE 1

High pressure tubular polymerization conditions for the production of low density polyethylene

| Variable | Unit | S1 | S2 | Conventional tubular process parameters |
|---|---|---|---|---|
| Reactor Pressure | bar | 1.628 | 1.607 | 2200 |
| CTA (propene) | Kg/h | 0 | 0 | 64-200 |
| Zone 1 Feed Temperature | °C. | 114 | 123 | 120 |
| Zone 1 Peak Temperature | °C. | 225 | 232 | 260 |
| Zone 2 Feed Temperature | °C. | 209 | 207 | 220 |
| Zone 2 Peak Temperature | °C. | 287 | 294 | 290 |
| Zone 3 Feed Temperature | °C. | 264 | 254 | — |
| Zone 3 Peak Temperature | °C. | 304 | 309 | — |
| Reactor Outlet Temperature | °C. | 247 | 239 | 235 |
| Hypercompressor Flow | kg/h | 38.915 | 40.315 | 38.987 |
| Conversion (weight of polymer/weight of delivered ethylene) | % | 23.1 | 24.7 | 30.6 |

Example 2—Polymer Characterization

The low density polyethylenes (LDPE) produced with the inventive process (S1 and S2) were characterized with several polymer characterization techniques and the results are shown in the Table 2 below. In addition, some commercially available autoclave and tubular LDPE grades were also characterized for comparative purposes. Melting point was measured according to ASTM D-3418. Gels were identified and quantified with instrumentation OCS (optical camera) using films with a thickness of 40 μm, extruded at the melt temperature 195° C. The count of gel levels, per unit area was measured, 3 $m^2$ area was inspected, based on counts gel size in four classes: Cat1 (201-500 μm), Cat2 (501-1000 μm), Cat3 (1001-1500 μm) and Cat4: >1500 μm.

TABLE 2

LDPE characterization

| Sample | | LDPE 2005E (Competitor 1) | AGYLITY EC7000 (Competitor 2) | Reference Autoclave grade (BC818) | Reference Tubular grade (PB861) | Reference Autoclave grade (BG516) | Inventive S1 | Inventive S2 |
|---|---|---|---|---|---|---|---|---|
| Melt flow index (MEI) (190° c.@2.16 kg) | g/10 min | 4.8 | 3.8 | 8 | 4 | 4 | 4.2 | 3.8 |
| Density | g/$cm^3$ | 0.92 | 0.919 | 0.918 | 0.922 | 0.918 | 0.918 | 0.919 |
| Melting point | °C. | 108 | 110 | 105 | 110 | 106 | 109 | 109 |
| GPC(LS) | | | | | | | | |
| Mw | g/mol | 194.800 | 245.400 | 348.500 | 140800 | 697.100 | 275.200 | 309.600 |
| Mn | g/mol | 12.800 | 16.100 | 15.500 | 15800 | 14.500 | 16.700 | 23.100 |
| Mw/Mn | | 15.16 | 15.25 | 22.45 | 8.93 | 48 | 16.44 | 13.42 |
| Mz | g/mol | 2,261,100 | 3,159,600 | 2,519,900 | 1,063,400 | 4,426,800 | 5,093,200 | 5,135,300 |
| Rheological properties | | | | | | | | |
| $\eta_0$ (Eta0) | Pa·s | 10.190 | 12.293 | 4.226 | | 11500 | 10.920 | 11.003 |
| G' at 170° C. and G" = 500 Pa·s | Pa | 146 | 132 | 102 | 83 | 160 | 112 | 117 |
| Ea | | 50 | 49.5 | 41.1 | | | | |
| Melt strength (190° C.) | cN | 7.8 | 10.1 | 5.4 | 5.2 | 13.2 | 8.2 | 9.3 |
| Extensibility | cm/s | 14.4 | 14.3 | 14.8 | 13.1 | 14 | 14 | 13.9 |
| Extractable | | | | | | | | |
| C6 (hexane) | % | 3.16 | 3.06 | 2.37 | | | 4.44 | 3.8 |
| Gels | | | | | | | | |
| C3 and c4 >1000 μm | Pts/$m^2$ | 0 | o | 0 | | | 0 | 0 |
| C2 <1000 and >501 μm | Pts/$m^2$ | 1 | 0 | 0 | | | 1.6 | 0.4 |
| C1 <500 and <200 μm | Pts/$m^2$ | 2631 | 10 | 16 | | | 81 | 45 |

TABLE 2-continued

LDPE characterization

| Sample | | LDPE 2005E (Competitor 1) | AGYLITY EC7000 (Competitor 2) | Reference Autoclave grade (BC818) | Reference Tubular grade (PB861) | Reference Autoclave grade (BG516) | Inventive S1 | Inventive S2 |
|---|---|---|---|---|---|---|---|---|
| C0 <200 and <80 μm | Pts/m² | | | | | | 3898 | 3104 |

GPC Characterization

Figure 2:
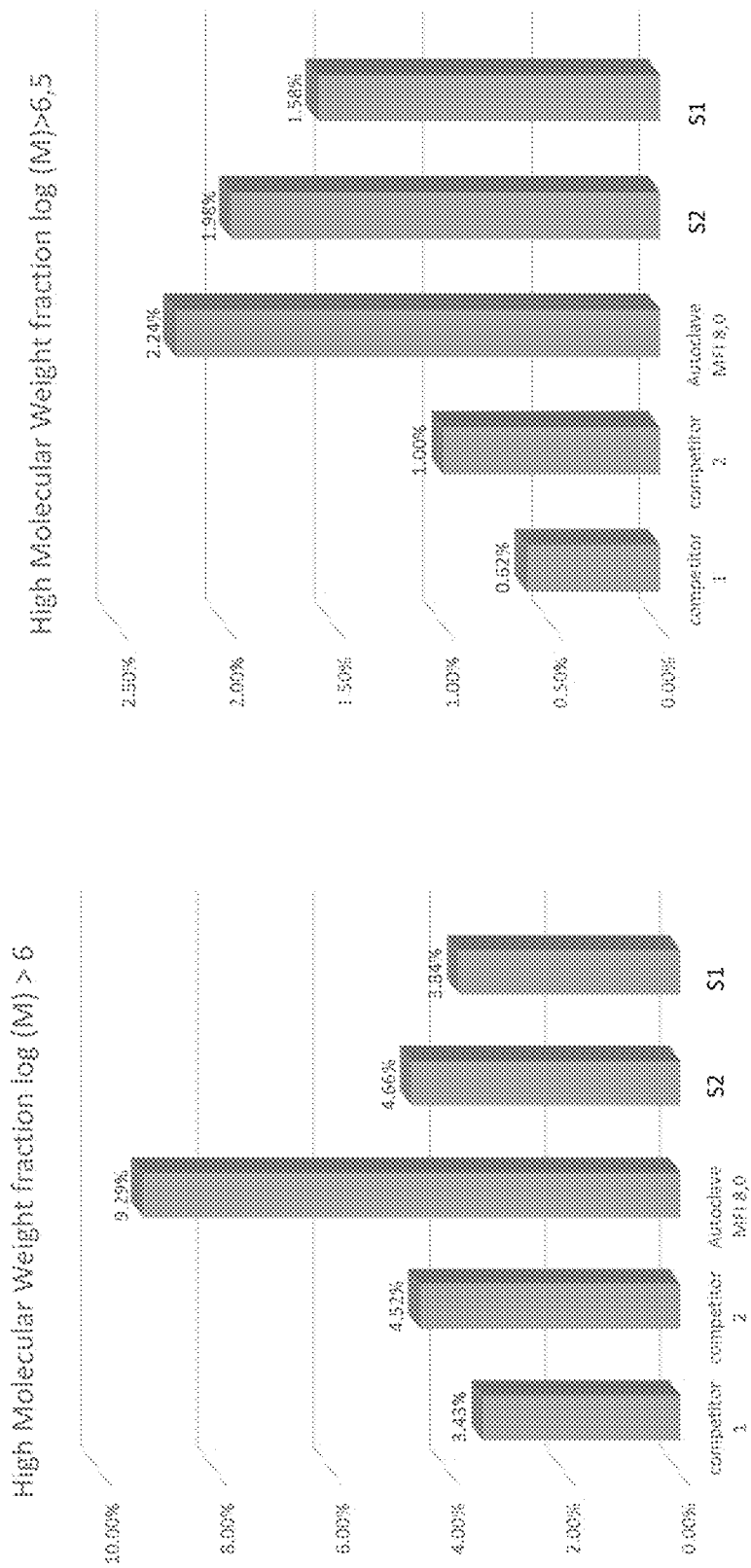
FIGS. 2A and 2B show molecular weight fractions with log(M) values higher than 6 and 6.5, respectively.

The molecular weight spectra of each produced polymer sample is shown in FIG. 1. It is clearly seen that the synthesis conditions applied for S1 and S2 samples generated high molecular weight fraction, which results in better polymer processing performance such as in extrusion coating applications. FIGS. 2A and 2B show the molecular weight fractions with log(M) value higher than 6 and higher than 6.5 respectively.

Although some similarity of high molecular weight fraction in terms of % of the area of the curve could be observed between the commercially available products and the inventive examples S1 and S2 when comparing the fractions with a log(M) higher than 6 (or M>1,000,000 g/mol), it can be observed that when comparing the higher molecular weight fractions with a log (M)>6.5 (or M>3,162,277 g/mol), the inventive samples S1 and S2 have higher percentages of area, comparable to those of autoclave grades.

Rheological Properties

Figure 3:
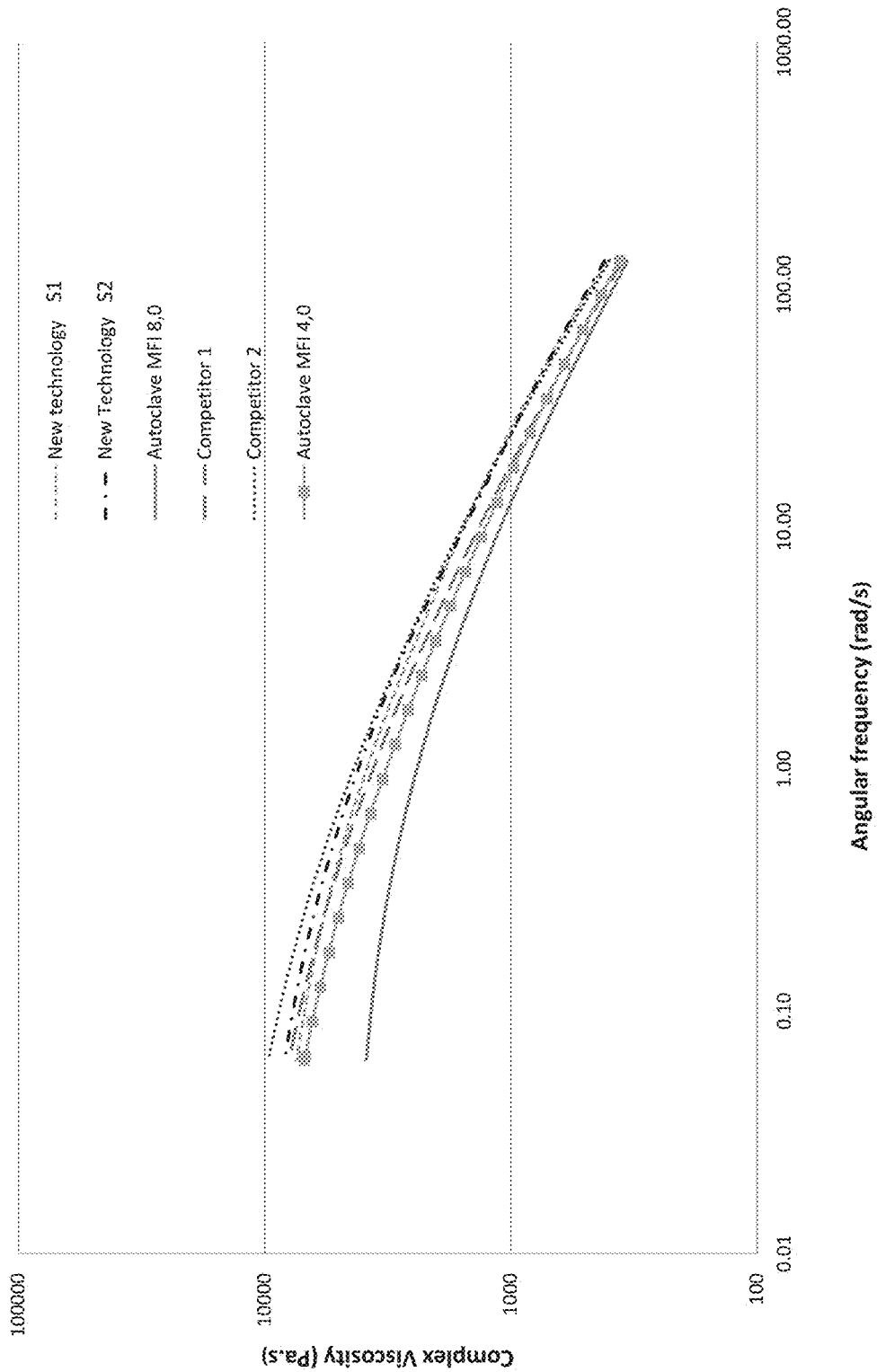
FIG. 3 shows complex viscosity of the polyethylene samples.
Figure 4:
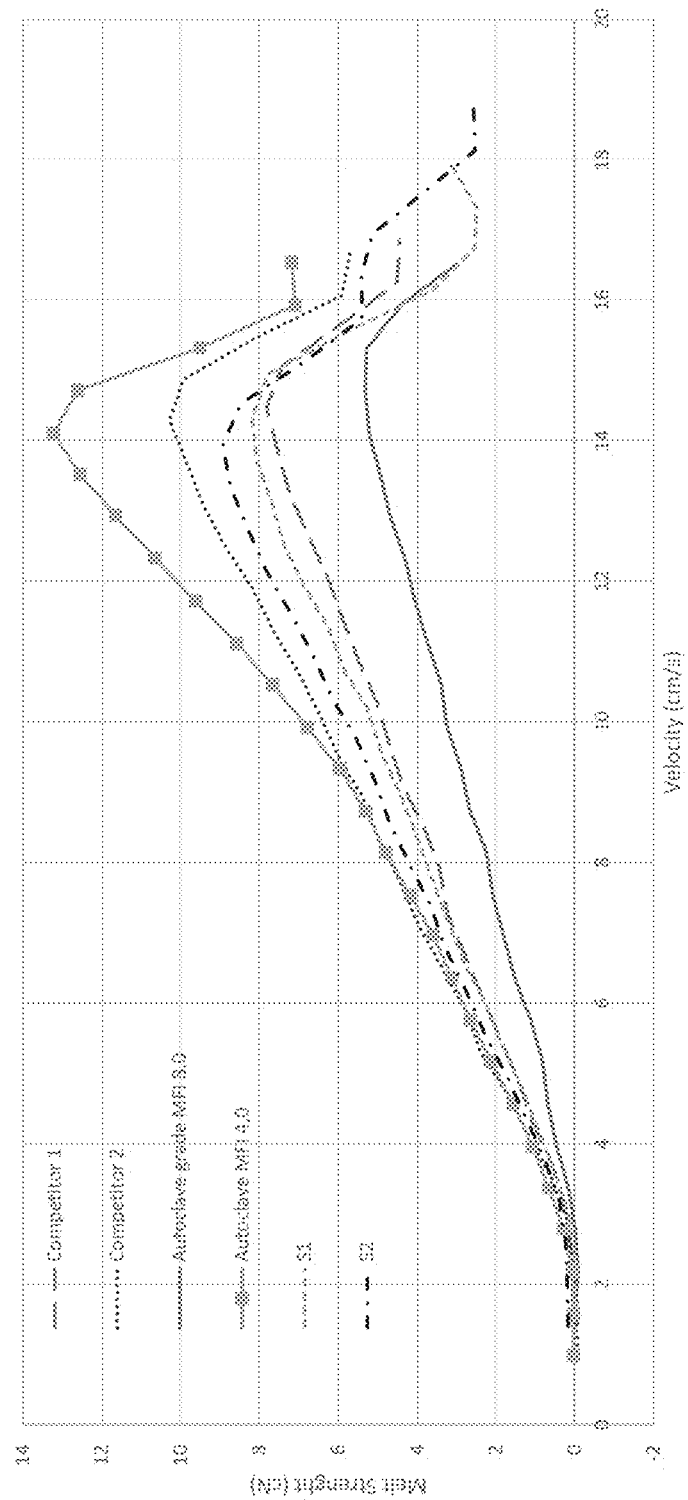
FIG. 4 shows melt strength of the polyethylene samples.
Figure 5:
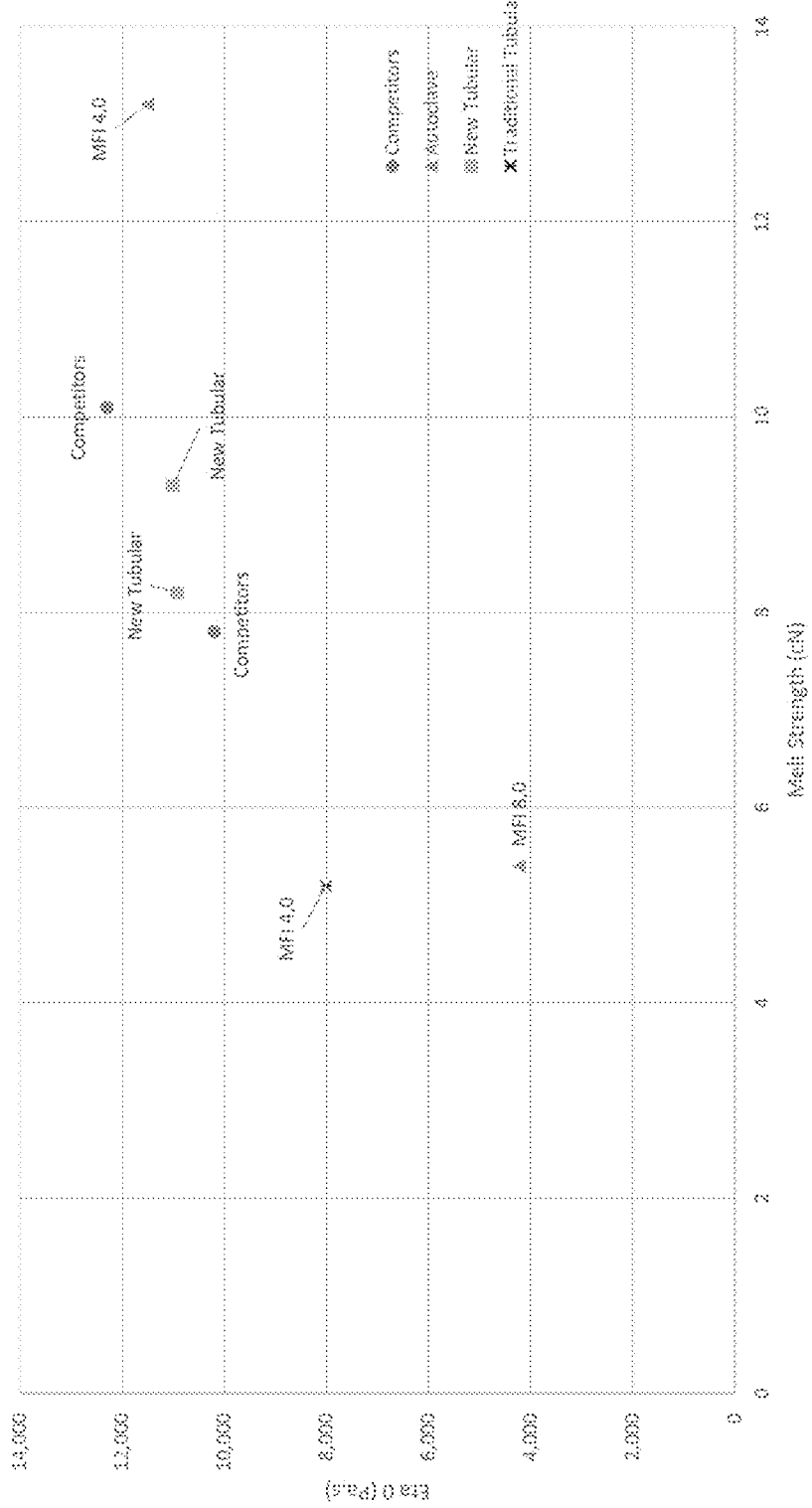
FIG. 5 shows melt strength and extensibility of the polyethylene samples.

The samples were also evaluated for rheological properties. By the analysis of complex viscosity (FIG. 3), melt strength (FIG. 4) and melt strength×extensibity (FIG. 5). It is possible to observe by the data that both Competitor resins and the inventive resins have similar rheological behavior. In particular, it is possible to observe by FIG. 5, considering the melt strength, a pronounced improvement when compared to a usual high pressure tubular grade for the same melt index. By plotting melt strength×Eta0 (FIG. 5) it is possible to differentiate the effect of autoclave and tubular grades, wherein to have the same melt strength, the tubular resin must to have a compensatory higher Eta0. The inventive LDPE tubular grades, generated with an addition of high molecular weight fraction to LDPE which give a higher elasticity to the product, will consequently improve the resin processability in polymer processing processes (such as for extrusion coating process).

Example 3—Test in Extrusion Coating

End-use application trials were run to analyze the performance of the inventive products herein disclosed in extrusion coating application. Inventive S2 and an autoclave grade with MFI 8,0, used as a comparative example, were processed in a SML Extrusion Coating FlexPack machine with a temperature profile as shown in Table 3.

TABLE 3

Extrusion coating machine temperature profile

| Temperature (° C.) | Zone 1 (° C.) | Zone 2 (° C.) | Zone 3 (° C.) | Zone 4 (° C.) | Zone 5 (° C.) | Die (° C.) |
|---|---|---|---|---|---|---|
| 305 | 285 | 295 | 300 | 305 | 305 | 305 |
| 315 | 288 | 300 | 305 | 310 | 315 | 315 |
| 325 | 295 | 300 | 315 | 325 | 330 | 325 |

Figure 6B:
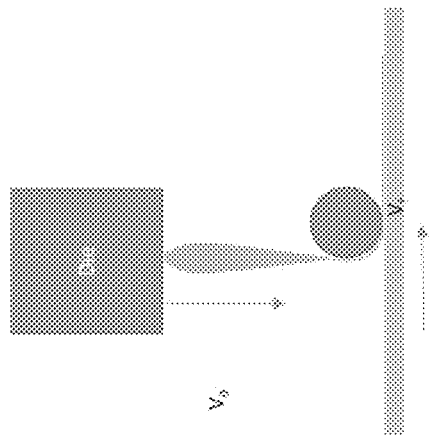
FIGS. 6A and 6B show die geometry for calculating a draw down ratio.
Figure 6A:
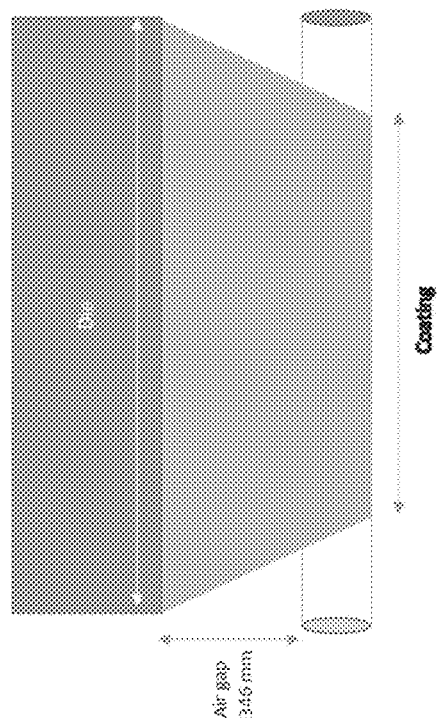

By the parameters given in FIGS. 6A and 6B, it is possible to calculate the draw down ratio (DDR), which represents the speed ratio between the coating film formation and the flow in the die, and also the Neck-in (NI) as expressed by:

$$\text{Neck In (NI)} = (\text{Die width} - \text{Coating width})/2$$

$$DDR = (vf/vo)$$

vf: line speed (m/min), and
vo: initial film speed in the die
Two different experiments were run to evaluate the inventive polymers in the extrusion coating process.

Example 3a

Figure 7A:
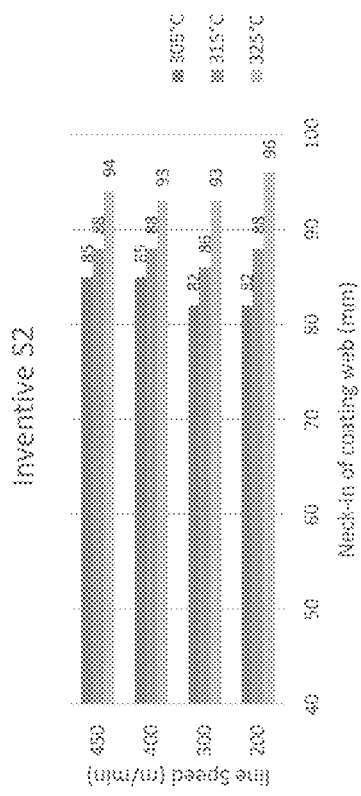
FIGS. 7A and 7B show Neck-in results for the polyethylene samples.
Figure 7B:
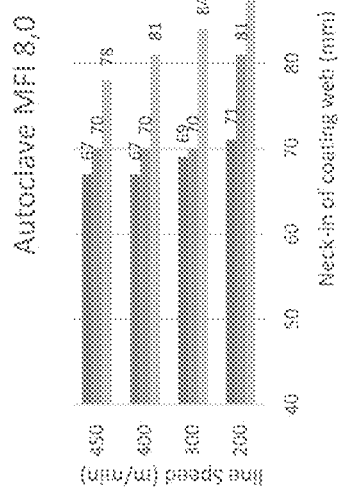

For the following example, the extrusion coating process was conducted considering:
Acceleration stepwise (100 m/min);
Each step 5 min; starting 200 m/min until maximum line speed of extrusion coating machine (450 m/min)
By the comparison of Neck-in results in FIGS. 7A and 7B, it is clear that autoclave resin showed a low neck-in effect at lower temperatures and the neck-in effect became lower at higher line speeds. On the other hand, the inventive LDPE disclosed herein, it has a lower temperature dependency on the level of neck-in, also having the benefit of having a more stable relationship with the line speed. The inventive LDPE brings benefits to avoid line width oscillation through extrusion stability, making possible the use of the inventive LDPE in applications that traditionally only autoclave grades were capable of supporting.

Example 3b

In the present example, the draw down ratio (DDR) was determined during constant line speed (at maximum line speed=450 m/min) and reduction of output rpm, which results in a decreasing coating weight (thickness) until film break.
Stable processing under given conditions at 450 m/min and 14 gms (g/m²)
Using three setting of extrusion temperature (305° C., 315° C., 325° C.)

Fixation of die width and coating weight (990 mm)

Fixation of gap air gap length (346 mm)

Substrate: kraft paper 70 (gms)

Figure 8:
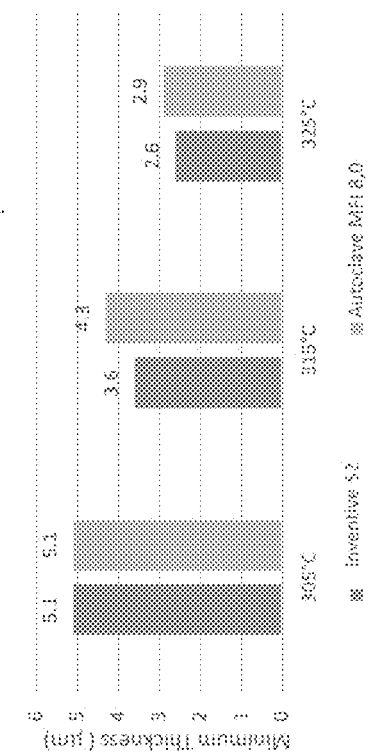
FIG. 8 shows draw down ratios for varying melt temperatures for the polyethylene samples.

By the analysis of the DDR of the resins (FIG. 8), it is possible to observe that the die swell of inventive S2 grade (less elastic) brings a smaller DDR value comparing to Autoclave grade in the processing conditions. However, the changes with the temperature are smaller, which can bring some benefits to process stability, being it absorbed by resins characteristics.

Figure 9:
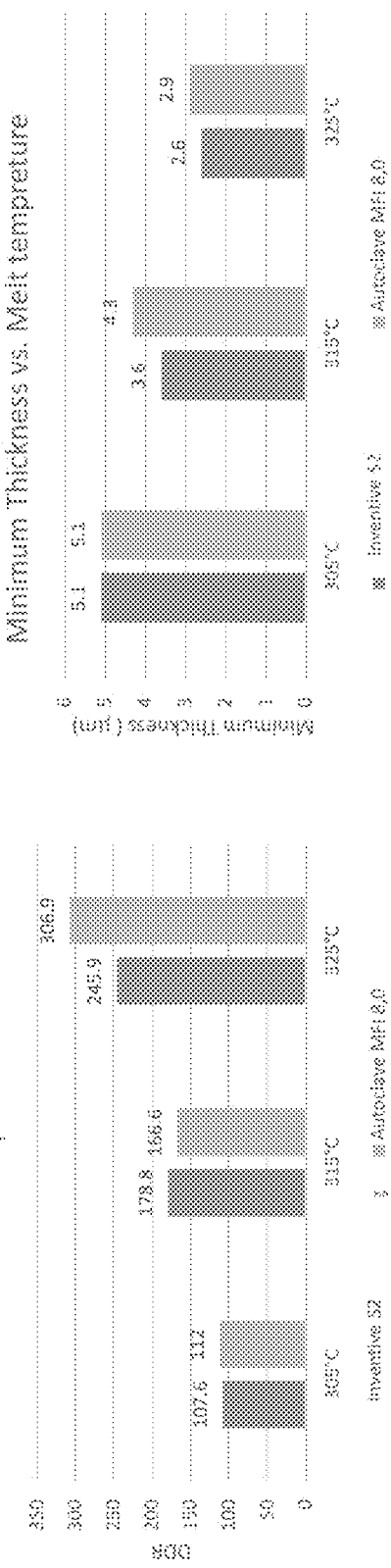
FIG. 9 shows minimum thickness for varying melt temperatures for the polyethylene samples.

Further, when analyzing FIG. 9, it is possible also to observe that at similar extrusion conditions (450 m/min at 305° C.), the minimum thickness reached by the inventive S2 and autoclave resin is the same for both. However, with a temperature increase, the inventive LDPE showed a possibility to reduce the thickness of coating films, which would benefit extrusion coating applications and furthering circular economy concepts by the use of less material in the same application.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
polymerizing ethylene in a tubular reactor, the polymerization being substantially free of a chain transfer agent, and having at least three peak temperatures during the polymerization at the tubular reactor, and wherein the first peak temperature is within the range of 200 to 240° C.

2. The method of claim 1, wherein the ethylene has a delivery pressure ranging from about 1400 to 1800 bar.

3. A method, comprising:
polymerizing ethylene in a tubular reactor, the ethylene having a specific delivery pressure and the polymerization having at least three peak temperatures during the polymerization at the tubular reactor, wherein the molecular weight of the resulting polyethylene is controlled by the selection of the delivery pressure and the at least three peak temperatures.

4. The method of claim 3, wherein the ethylene has a delivery pressure ranging from about 1400 to 1800 bar.

5. The method of claim 3, wherein the polymerization has a chain transfer power of less than 5.0%.

6. The method of claim 3, wherein the tubular reactor has a maximum peak temperature ranging from about 295 to 310° C. during the polymerization.

7. The method of claim 3, wherein the ethylene-containing polymer produced has a density, according to ASTM D792 Method B, ranging from about 0.918 to 0.921 g/cm$^3$.

8. The method of claim 3, wherein the ethylene-containing polymer produced has a weight average molecular weight ranging from about 275,000 to about 320,000 g/mol.

9. The method of claim 3, wherein the ethylene-containing polymer produced has a Z average molecular weight (Mz) ranging from about 4,000,000 to about 5,200,000 g/mol.

10. The method of claim 3, wherein the ethylene-containing polymer produced has a polydispersity index that is greater than about 13.0.

11. The method of claim 3, wherein the ethylene-containing polymer produced has a zero viscosity ranging from about 8,000 to 13,000 Pa s at 170° C.

12. The method of claim 3, wherein the ethylene-containing polymer produced has a melt flow index measured at 190° C./2.16 kg ranging from about 3.5 to 6.0 g/10 min.

13. The method of claim 3, wherein the ethylene-containing polymer produced has an elastic modulus that is above about 105 Pa at 170° C. (G' at G"=500 Pa).

14. The method of claim 3, wherein the ethylene-containing polymer produced has a high molecular weight fraction so that a GPC analysis of the polyethylene has at least 1.5% area under the curve at a log M value of at least 6.5.

15. The method of claim 3, wherein the ethylene-containing polymer produced has a melt strength of at least about 6.0 cN at 190° C.

16. The method of claim 3, wherein the ethylene-containing polymer produced has an extensibility of at least 9 cm/s at 190° C.

17. The method of claim 3, further comprising:
extruding the ethylene-containing polymer.

* * * * *